March 26, 1963
P. P. THOMAS
3,082,485
ELEMENTS HAVING LOW FRICTION MATERIAL
COMPACTED ON THE FACE THEREOF
Filed April 7, 1958
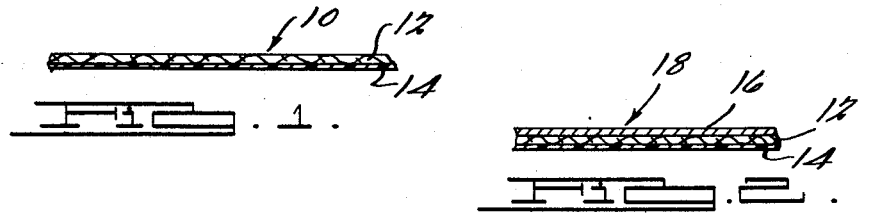
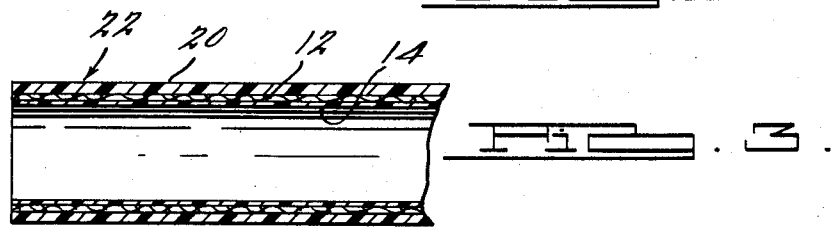
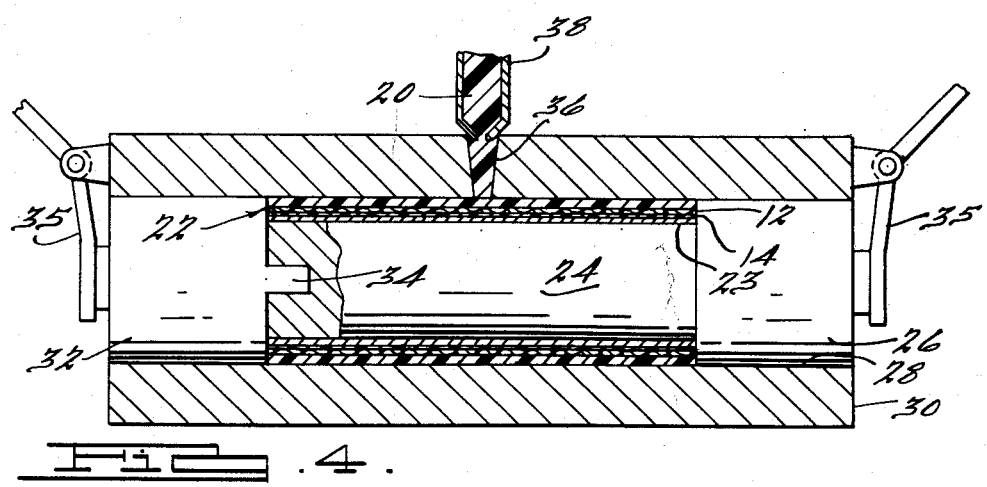
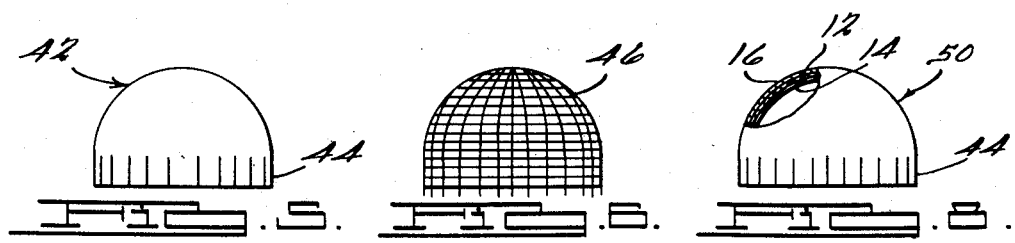
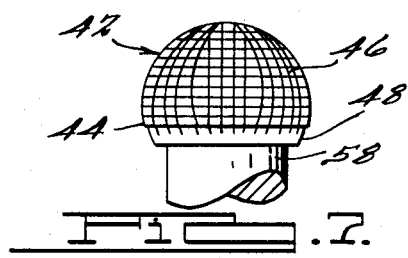
INVENTOR.
Paul P. Thomas.
BY
Harness, Dickey & Pierce.
ATTORNEYS.

United States Patent Office 3,082,485
Patented Mar. 26, 1963

3,082,485
ELEMENTS HAVING LOW FRICTION MATERIAL COMPACTED ON THE FACE THEREOF
Paul P. Thomas, Detroit, Mich., assignor to American Metal Products Company, Detroit, Mich., a corporation of Michigan
Filed Apr. 7, 1958, Ser. No. 726,707
4 Claims. (Cl. 18—59)

This invention relates to low friction elements and methods of making such elements, and particularly to a conformable low friction element having low friction material mechanically retained on one face thereof.

Recently extensive efforts have been made to develop techniques for employing fluorocarbon materials such as polytetrafluoroethylene as low friction bearing surfaces. The major problem encountered in the use of such fluorocarbon materials for bearing surfaces is that they are extremely difficult to bond to backing materials or elements which are necessary to complete the bearing structures. Further, in most techniques developed today for securing backing elements to fluorocarbon materials, the fluorocarbon materials have been used in either sheet, woven cloth or other solid forms which are relatively expensive.

The present invention greatly reduces the cost of such low friction elements by employing fluorocarbon materials in either solution or dispersion form, that is, wherein minute particles of the fluorocarbon materials are dispersed in a suitable liquid vehicle so that they may be applied to surfaces by spraying, dipping, brushing, or the like. In one embodiment of the invention, the fluorocarbon material is applied in dispersion form to the surface of a woven piece of cloth, for example, which is then heated to evaporate the liquid vehicle. The surface of the cloth having the dried low friction material thereon is then placed against the surface of an element and the cloth is then engaged by a suitable backing material or backing member which exerts a sufficient pressure thereon to maintain the low friction material in intimate engagement with the element, the backing material or backing material being bonded or otherwise prevented from moving relative to the cloth. Likewise, if the low friction material is used in the form of a solution rather than a dispersion, it is applied in exactly the same manner and dried out after it impregnates the cloth to provide a homogeneous layer of low friction material which is mechanically locked to the interstices of the cloth.

From the above description, it is apparent that the woven cloth is only one example of a suitable backing layer, and that the backing layer can be any material, including felting, that preferably can be bonded or otherwise affixed to the particular backing material selected, and permit the low friction material to be impregnated on the face thereof to mechanically prevent movement therebetween.

The main objects of the invention are to provide a low friction element; to provide a low friction element having a dispersion of low friction particles impregnated on the face thereof; to provide a low friction element having a solution of low friction material impregnated on one face thereof; to provide a low friction element comprising a backing layer of cloth-like material or the like having low friction material impregnated on one face thereof with a rigid backing layer secured to the other face thereof; to provide a method of making a low friction element comprising coating the surface of a cloth-like backing layer with low friction material in fluid form, drying the material, conforming the backing layer about an element with the low friction material therebetween, and molding a hardenable backing material about said backing layer to conform it accurately to the surface of the element and maintain the low friction material mechanically locked on the face of the backing layer to physically prevent movement therebetween; and to provide a low friction element which is economical to manufacture and effective in use.

Other objects and features of novelty of the invention will be specifically pointed out or otherwise become apparent when referring, for a better understanding of the invention, to the following description taken in conjunction with the accompanying drawing, wherein:

FIGURE 1 is an enlarged broken sectional view of a laminated material illustrating one embodiment of the invention;

FIG. 2 is an enlarged broken sectional view of a laminated material illustrating another embodiment of the invention;

FIG. 3 is a broken sectional view of a bushing embodying features of the invention;

FIG. 4 is a broken sectional view of apparatus for making the bushing of FIG. 3;

FIG. 5 is a view of a bearing cap for the ball of a stud and ball made from the laminate of FIG. 1;

FIG. 6 is a view of the bearing cap of FIG. 5 with a wire screen formed thereon;

FIG. 7 is a view of a bearing cap after it has been conformed to the surface of the ball of a stud and ball; and FIG. 8 is a view of a bearing cap made from the laminate of FIG. 2.

Referring to FIG. 1, a low friction laminate 10 illustrating one embodiment of the invention is comprised of a backing layer 12 made of a woven cotton duck material, for example, having a layer 14 of low friction material impregnated on one face thereof so that it is mechanically retained thereon after it has been dried by the application of heat. The low friction material may be polytetrafluoroethylene, polymonochlorotrifluoroethylene, or other low friction fluorocarbon materials, and which can be applied to the backing layer 12 by spraying, brushing, or dipping. The low friction material is then dried by the application of heat to form a solid coating or layer which is mechanically retained on the backing layer 12 by virtue of its penetration into the interstices of the backing layer when the face of the backing layer is impregnated with the low friction material in fluid form. If desired, the layer 14 may be compacted to make it more dense and further embed it into the backing layer 12.

One manner in which the laminate 10 may be used is to conform it about an element with the layer 14 in engagement with the surface of the element, after which a hardenable backing material can be molded about the element in a manner to exert a predetermined pressure on the laminate 10 to accurately conform the low friction layer 14 to the surface of the element. In this manner, the low friction material is further embedded or pressed into the layer 12 and trapped so as to be mechanically retained against movement relative thereto, and also further planished or compacted to provide a homogeneous low friction surface accurately mated to the surface of the element. Of course, the thickness of the planished homogeneous surface will depend on the thickness of the low friction material initially applied to the backing layer 12.

Reference is made to a copending application of Charles S. White, Serial No. 619,782, filed on November 1, 1956 and now abandoned, and under which the assignee of the present invention holds an exclusive license, for a complete and full description of the procedure and materials for conforming low friction material to the surface of elements as described above. In the White application a layer of woven low friction cloth having bondable fibers interwoven on one face thereof is conformed to the surface of a ball, for example, by a hardenable backing material injected within a housing disposed about the ball, the backing material maintaining the woven polytetrafluoroethylene in intimate engagement with the surface of the ball after it hardens.

The White application also discloses a barrier layer formed from a formaldehyde or resin material which will bond to the bondable fibers interwoven on one face of the polytetrafluoroethylene cloth to prevent the flow of the hardenable backing material through to the face of the ball. Of course, the barrier layer can be any suitable material which will bond or otherwise be affixed to the material of the backing layer 12. An example of such a barrier layer 16 is illustrated in FIG. 2 wherein a metal foil material is affixed to one face of the backing layer 12 with the low friction layer 14 provided as previously described to form a laminate 18. It is apparent that when a backing material such as the molded backing material is applied, it will press the metal foil into the interstices of the backing layer 12 to prevent relative sliding movement therebetween.

An example of a low friction element having the laminate 10 of FIG. 1 with a molded backing material 20 to form a bushing 22 is illustrated in FIG. 3, the molded backing material 20 providing what may be aptly termed as "a backing member" for the laminate 10. The bushing 22 of FIG. 3 is illustrated as having the laminate 10 as the low friction surface thereof, by way of example only, since it is apparent that the laminate 18 could be employed in place of the laminate 10. One method for making the bushing 22 of FIG. 3 is illustrated in FIG. 4 wherein the laminate 10 is positioned on a sleeve 23 which in turn is disposed on a shaft 24 having a slightly enlarged head 26 on one end thereof which accurately fits within a cylindrical bore 28 of a body 30. A second head 32 is disposed within the other end of the bore 28 and has a key 34 projecting therefrom to releasably engage the shaft 24 to position the sleeve 23 on center and to close off the bore 28 to define a mold. Clamps 35 are pivotally mounted on the body 30 to maintain the heads 26 and 32 and the shaft 24 in the position shown in FIG. 4.

It will be observed that the body 30 has an aperture 36 in the upper wall thereof to permit a nozzle 38 of an injection machine (not shown) to be aligned therewith to inject the hardenable backing material 20 through the aperture 36 under pressure to completely fill the space between the laminate 10 and the portion of the bore 28 between the heads 26 and 32. Because of the pressure applied, the backing material 20 molds itself about the sleeve 23 and exerts a predetermined pressure against the laminate 10 to accurately conform it to the surface of the sleeve 23.

When the injection nozzle 38 is withdrawn and the backing material 20 encompassing the laminate 10 hardens, the clamps 35 may be pivoted out of the way, and the entire assembly removed from the cylindrical aperture 36 of the body 30. The head 32 may then be disengaged from the shaft 24 and the shaft 24 removed from the sleeve 23. The bushing 22 and the sleeve 23 can either be used in assembled relation to take advantage of the bearing surface between the sleeve and the bushing, or the bushing 22 may be used separately on a shaft having the same diameter as the outer diameter of the sleeve 23. If desired, the latter may be accomplished by positioning the sleeve 23 adjacent the end of the shaft it is to be mounted on, and sliding the bushing 22 from the sleeve 23 onto the shaft. Reference is made to the aforesaid copending application, Serial No. 619,782, for a further description of bushings made in the manner illustrated in FIG. 4.

A number of materials are suitable for use as the hardenable backing material 20. Polyethylene molding compounds may be employed, two being procurable on the market, one under the name of super-Dyland, the other under the name of Marlex. Phenolic impregnated glass fibrous material procurable in the trade under the name of Durez, and a form of nylon material, procurable on the market under the name of Zytel, have also been employed, as well as, a phenolic and polyethylene impregnated glass fibrous material.

As stated previously, the laminate 18 could be substituted for the laminate 10 to provide a low friction face for the bushing 22. When the laminate 18 is so used, the barrier layer 16 will prevent the flow of the hardenable backing material 20 through the backing layer 12 when it is injected as illustrated in FIG. 4. However, when the laminate 10 is used without the barrier layer 16 thereon, experience has proved that the low friction layer 14 also tends to serve as a barrier layer itself to prevent the flow of the backing material through to the surface of the sleeve 23. It is apparent that when the low friction layer 14 is impregnated and dried on the surface of the backing layer 12 it will provide a substantially homogeneous mass which blocks the flow of the backing material therethrough. Further, the thickness of the low friction layer 14 can be increased as desired to further enhance its barrier characteristics.

This is true of low friction materials applied in either solution or dispersion form. However, technically speaking, material such as polytetrafluoroethylene applied in dispersion form is not homogeneous, but rather a multitude of discrete minute particles which fill in the interstices of the backing layer 12 and tend to bond or stick to form a substantially homogeneous mass. It is not understood exactly why the polytetrafluoroethylene particles tend to bond together but it is theorized that it may be due to an electrical attraction between particles and also that the wetting agent employed in the dispersion promotes the bonding tendency.

It would also be well to point out at this time that although the invention has been disclosed as employing a molded or injected backing material for engaging the laminates 10 or 18, it is to be specifically understood that the invention is not limited to the use of such backing materials, although they are preferred since they accurately conform the laminates to elements to provide low friction surfaces which eliminate the dimension problems encountered in mating two separately made bearing elements. It is apparent that any suitable backing material or element may be employed as a backing for the laminates as long as it can be bonded or otherwise affixed to the laminates to prevent movement therebetween and maintain the laminates in engagement with the selected element. For example, a resilient backing backing material such as rubber may be employed in place of the backing material 20 illustrated in FIG. 3 to provide a backing for the laminates 10 or 18. The rubber may be in the form of a sleeve or boot which can be compressed by an outer housing so as to engage the laminates with sufficient force to compress them against the element for which they are to form a bearing surface. The rubber can either be bonded to the laminates by conventional bonding materials to prevent movement therebetween, or for some applications, the friction therebetween relied on to prevent movement. Also, if desired, the rubber can be injected in the same manner as illustrated in FIG. 4 to form the backing.

When rubber or other resilient material is used as the backing element, the present invention lends itself for use in a variety of seal applications wherein the low friction layer 14 can engage the surface to be sealed in a tight fit and with a minimum of undesirable friction and consequent wear. Of course, it is readily apparent that resilient seals do have many different shapes and forms depending on the particular seal application. It is to be specifically understood that the present invention is obviously not limited to bushing type seals as described above, but rather may be employed with a variety of seal shapes, such as the annular face of a washer-like or cup-shaped seal, for example.

It would also be well to point out at this time that the bushing 22, or the like, could be formed by coating the low friction layer 14 directly onto the sleeve 23, for example, and thereafter wrapping or otherwise positioning the backing layer 12 about the sleeve. Once this has been done, it is apparent that the injection procedure previously described and illustrated in FIG. 4 can be used for making the bushing, if desired. Likewise, it is apparent that prior to wrapping the backing layer 12, the low friction layer 14 may be dried by gentle heating so that it will tend to cling to the bushing 22. This permits the backing layer 12 to be wrapped thereabout with less likelihood of removing some of the low friction layer from portions of the surface of the bushing.

In FIG. 5, a bearing cap 42 is illustrated which is adapted to fit over the ball of a stud and ball. It is formed from the material of the laminate 10 of FIG. 1 by suitable dies as described in the aforesaid copending application, and has a slotted skirt portion 44 extending from the major diameter thereof to permit the cap to overlap the major diameter of the ball. The skirt portion 44 can be conformed to the surface of the ball by various methods to mechanically lock the cap on the ball. Referring to FIGS. 6 and 7, one way to lock the cap 42 over a ball 48 on the end of a stud 58 is to form a wire screen 46 as illustrated in FIG. 6 and position both the bearing cap 42 and the wire screen 46 over the ball 48 as illustrated in FIG. 6, the slotted skirt portion 44 being conformed to the surface of the ball 48 by bending the wire screen adjacent thereto to mechanically lock it on the ball. A housing may then be disposed about the ball 48 and a hardenable backing material injected therein as disclosed in the aforesaid copending application to provide a rigid backing for the bearing cap 42. In this manner, the low friction particles of the laminate 10 will engage the surface of the layer 14 to provide a low friction bearing surface for the ball 48.

The wire screen 46 may also be partially interwoven with the backing layer 12 so that it is mechanically connected thereto, or the wire screen can simply be positioned against the backing layer of the laminate 10 prior to its being formed into a bearing cap. With either of these arrangements the cap, as illustrated in FIG. 7, can, of course, be formed in one piece rather than the two separate pieces illustrated in FIGS. 5 and 6. In addition to conforming and locking the cap to the ball to enable the molded backing material to be applied thereto, the wire screen 46 adds reinforcement to the resulting structure in two directions after the molded backing material is applied.

Another embodiment is disclosed in FIG. 8 wherein a bearing cap 50 is formed from the laminate 18 having a metal foil barrier layer 16. With this construction, the metal foil can be used to conform the skirt portion 44 to the ball to obviate the need for the wire screen 46. As previously described, the barrier layer 16 can be any material that can be affixed to the backing layer 12 and prevent the flow through of backing material, and obviously whenever the material is such that it retains its shape after deformation, it can also be used to conform the skirt portion 44 as does the metal foil in the bearing cap 50.

By way of example only, the following low friction materials have been successfully employed by applicant in practicing the present invention. An aqueous dispersion supplied by DuPont de Nemours, Inc. containing (a) 59 to 61% by weight of tetrafluoroethylene resin, (b) 5.5 to 6.5% (by weight of tetrafluoroethylene resin) of Triton, a non-ionic wetting agent, and (c) the remainder being water.

The water dispersion is preferably sprayed on any fabric such as cotton, rayon, nylon, and acrylic fabrics, for example, at room temperature. The sprayed fabric is then dried at any temperature suitable for evaporating the water without harming the fabric. If cotton is employed, the temperature should be above 225° F. and below 325° F., the 225° F. being mentioned merely because the temperature should be somewhat above the boiling point of water and the 325° F. being mentioned since higher temperatures are injurious to the cotton fabric. The resulting laminate may then be formed and molded into bearing elements as previously described.

Monochlorotrifluoroethylene (sometimes referred to as polyhalocarbon) supplied by Bakelite Co., Division of Union Carbide and Carbon Corp., 30 E. 42nd Street, New York 17, N.Y. and M. W. Kellogg Co., Jersey City, N.J. has also been employed in both solution and dispersion form. The exact nature of the polyhalocarbon dispersion supplied by these companies is not known, but it might be mentioned that polyhalocarbons are not dispersed in water but are rather dispersed in an organic solvent. The solution is made up of a monochlorotrifluoroethylene resin dissolved in the monochlorotrifluoroethylene monomer. The drying operation in either dispersion or solution form is performed at a temperature of 270° F. to 325° F.

While it will be apparent that the embodiments of the invention herein disclosed are well calculated to fulfill the objects of the invention, it will be appreciated that the invention is susceptible to modification, variation and change, and that dispersions or solutions of low friction material other than those mentioned above, may be employed without departing from the proper scope or fair meaning of the subjoined claims.

What is claimed is:

1. The method of making a ball joint element, which includes the steps of, impregnating a low friction material on a surface of a woven backing layer having a wire screen interwoven therewith so as to be mechanically secured on the other surface thereof, forming the backing layer and wire screen into a hemispherical bearing cap having a skirt portion depending from the major diameter thereof with the low friction material on the inner face thereof, and conforming the skirt portion to the surface of the ball of the element below the major diameter thereof which is retained in said conformed position by said wire screen.

2. In combination, a stud having an enlarged ball on one end thereof, a bearing cap comprising a laminate having a semi-spherical shape with a cylindrical skirt portion depending from the major diameter thereof, said laminate comprising a fabric backing layer having a low friction layer fluorocarbon material impregnated on the inner face thereof and a wire screen secured to the outer face thereof, said cap being disposed over said ball with said skirt portion deformed to slidably engage said low friction material against the surface of the ball and to mechanically lock the cap on the ball.

3. A method of making a low friction element, which includes the steps of, coating the surface of a bearing member with a polytetrafluorethylene dispersion material, conforming a fabric backing layer to said surface and against said polytetrafluorethylene material, and engaging the backing layer with a backing member in a manner to prevent movement therebetween and exert predetermined pressure thereon to accurately conform the backing layer and the polytetrafluorethylene material to said surface and to mechanically embed the polytetrafluorethylene material in said fabric backing layer.

4. The method of making a ball joint element, which includes the steps of, impregnating a low friction material on a surface of a fabric-like backing layer, conforming the backing layer into a semi-spherical bearing cap having a skirt depending from the major diameter thereof with the low friction material on the inner face thereof, conforming said bearing cap to said ball with the skirt portion retained against the surface of the ball below the major diameter thereof, and engaging said backing layer with a wire screen backing member in a manner to prevent movement therebetween and exert a predetermined pressure thereon to accurately conform the backing layer and the low friction material to said ball and mechanically embed the low friction material in said backing layer.

References Cited in the file of this patent

UNITED STATES PATENTS

| | | |
|---|---|---|
| 2,400,099 | Brubaker et al. | May 14, 1946 |
| 2,411,159 | Hanford | Nov. 19, 1946 |
| 2,478,229 | Berry | Aug. 9, 1949 |
| 2,484,483 | Berry | Oct. 11, 1949 |
| 2,539,329 | Sanders | Jan. 23, 1951 |
| 2,581,454 | Sprung | Jan. 8, 1952 |
| 2,691,814 | Tait | Oct. 19, 1954 |
| 2,770,026 | Peterslie et al. | Nov. 13, 1956 |
| 2,777,783 | Welch | Jan. 15, 1957 |
| 2,804,886 | White | Sept. 3, 1957 |
| 2,812,570 | Peterslie et al. | Nov. 12, 1957 |
| 2,828,236 | West | Mar. 25, 1958 |
| 2,835,521 | White | May 20, 1958 |
| 2,838,436 | Clingman | June 10, 1958 |
| 2,840,881 | Bateman | July 1, 1958 |
| 2,885,248 | White | May 5, 1959 |

OTHER REFERENCES

"Teflon," DuPont Information Bulletin No. X–50c, 6 pp. March 15, 1955, 154-Teflon.